UNITED STATES PATENT OFFICE.

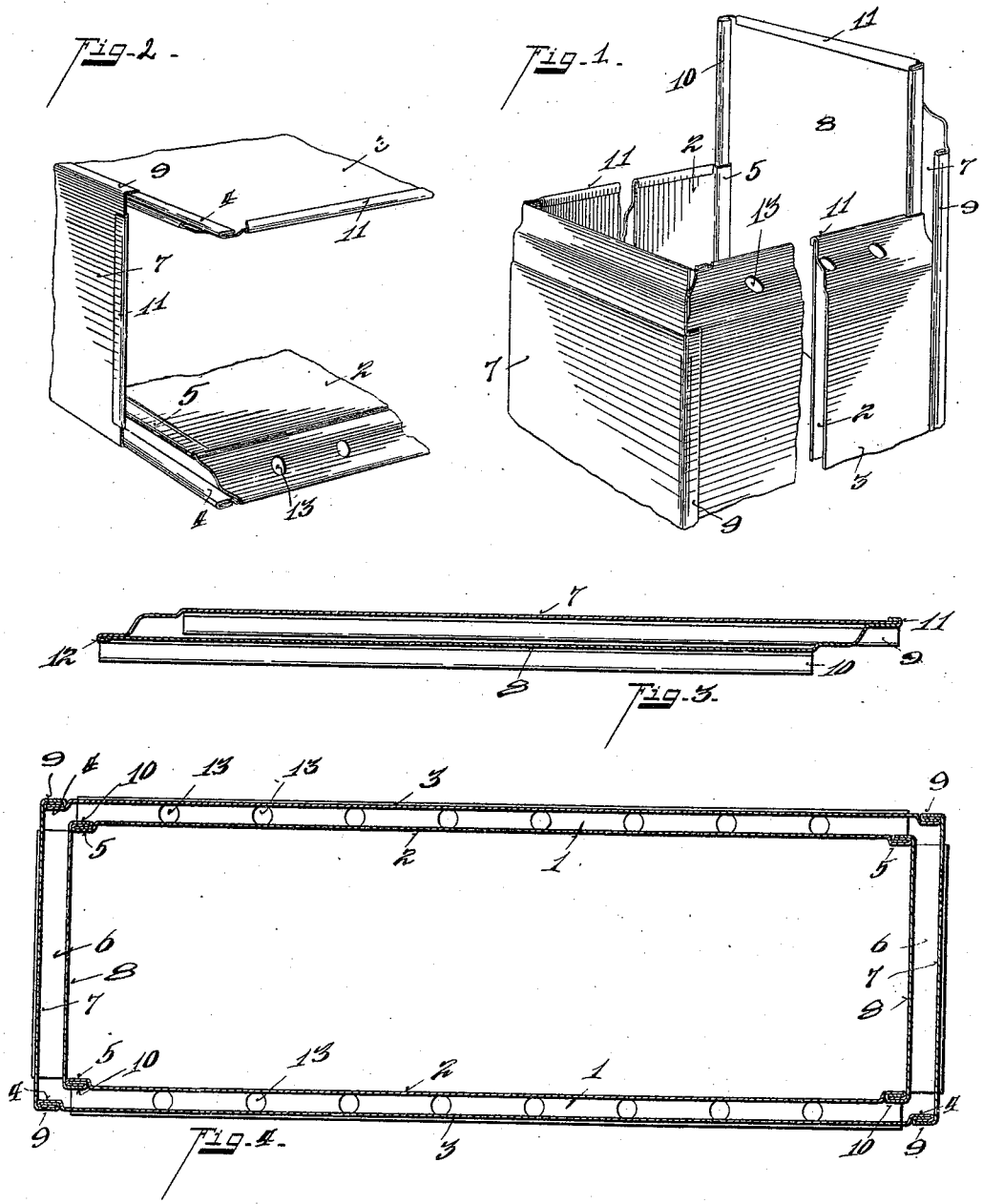

CHARLES J. HOLUB, OF NEWPORT, KENTUCKY, ASSIGNOR TO THE PECK, WILLIAMSON HEATING & VENTILATING COMPANY, OF CINCINNATI, OHIO, A CORPORATION.

FURNACE-HEAT-CONDUCTOR PIPE.

975,360.  Specification of Letters Patent.  Patented Nov. 8, 1910.

Application filed September 22, 1909. Serial No. 518,967.

*To all whom it may concern:*

Be it known that I, CHARLES J. HOLUB, a citizen of the United States, residing at Newport, in the county of Campbell and State of Kentucky, have invented certain new and useful Improvements in Furnace-Heat-Conductor Pipes, of which the following is a specification.

My invention relates to an improvement in pipes, primarily, to that type known as hot-air conductor pipe used with furnaces for heating purposes.

The object of my invention is to provide a hot-air conductor pipe of a series of sections interlocked or intermeshed with each other, with each section of double-wall formation, having an intermediate air space, providing a continuous air passage around the interior pipe member when the sections are intermeshed.

Another object of my invention is to provide a pipe formed of a series of sections detachably connected, with each section formed of two members, an inner and an outer, with the one connected to the other at the ends thereof, providing an intermediate air space, each member provided with hooked sides adapted to be respectively intermeshed with hooked sides of a second section in the formation of a pipe.

Another object of my invention is to provide a double-walled pipe length, with intermediate air-space between the walls, and formed of a series of sections detachably connected with the walls of the pipe sections terminating upon themselves, so as to telescopically fit into a second pipe length.

The features of the invention are more fully set forth in the description of the accompanying drawings, forming a part of this specification, in which:—

Figure 1 is a perspective view of a portion of the pipe length, with one of the sections partly detached. Fig. 2 is a perspective end view of a portion of the pipe, also illustrating one of the sections occupying a partly detached position. Fig. 3 is a transverse sectional view of one of the sections. Fig. 4 is a cross-section through the pipe.

As illustrated in the drawings, the pipe length is of rectangular form with each section formed of an inner and outer wall and intermediate space, composed of four sections intermeshed with each other at their corners, permitting a slidable engagement, rendering the same to be made knocked-down with the sections made in stock sizes. By such construction, various widths or sizes of walls can be assembled to form a pipe length, to meet conditions of usage, and in the knock-down form are convenient for shipping, with a saving in freight and crating costs, together with various other commercial advantages. The intermediate air-space makes the same more fire-proof in its installation between the walls of a building, as well as affording greater efficiency.

1 represents two of the double-walled pipe-sides, comprising an inner wall 2, and an outer wall 3, the sides of which are provided with the off-set hooks 4, 5.

6 represent the right-angled double-walled sections, provided with an outer wall 7, and an inner wall 8, each provided respectively with the right-angled hooked sides 9, 10, adapted to slidably engage with the respective hooked sides 4, 5, of the sections 1, to form a pipe with the edges and sides flush on their exterior.

The inner and outer walls of each section are connected together at their ends, as illustrated in Fig. 3, in which the inner wall 8, at one end is tapered toward the inner surface of the outer wall, and overlapping the same by a hook formation 11, forming an inward tapering connection, while the opposite ends of the wall of said section are provided with reverse formation, in that, the outer wall end tapers toward the inner wall and looped over the end of the inner wall by a hook formation 12, thus forming means for telescopically connecting one pipe length with another for installation. The tapering ends of each section are provided with a series of perforations 13, forming a continuous air-passage from one pipe length to another, when a series of pipe lengths are united.

Having described my invention, I claim:—

1. A pipe length formed of sheet metal, comprising four double-walled sections, each of the walls of said sections being formed at one end with a hooked bend, the walls of each section being separated intermediately and joined at each end by the hooked bend of one engaging the straight edge of the other, and adapted to form telescoping connection with a second pipe length, the sides of the walls of two of said sections provided with off-set, hooked portions and the sides of the walls of the other two sections with right-angle, hooked portions adapted to be respectively slidably intermeshed with the off-set hooked portions of the walls of the first named sections, and arranged to form a continuous air chamber between the walls of the sections around the entire pipe section.

2. A pipe length formed of sheet metal, comprising four double walled sections, with the walls of each section separated intermediately and joined at each end and formed for telescopic connection with a second length, said sections having ports formed in the ends thereof, the sides of the walls of two of said sections provided with off-set, hooked portions and the sides of the walls of the other two sections with right-angle, hooked portions adapted to respectively slidably intermesh with the off-set, hooked portions of the walls of the first named sections, and arranged to form a continuous air chamber between the walls of the sections around the entire pipe length adapted to communicate with a similar chamber of a second pipe length through said ports.

In testimony whereof, I have hereunto set my hand.

CHARLES J. HOLUB.

Witnesses:
  OLIVER B. KAISER,
  EMMA SPENER.